(12) United States Patent
Suzuki et al.

(10) Patent No.: US 11,959,709 B2
(45) Date of Patent: Apr. 16, 2024

(54) HEAT TRANSPORT DEVICE AND METHOD FOR MANUFACTURING SAME

(71) Applicant: WELCON INC., Niigata (JP)

(72) Inventors: Yutaka Suzuki, Niigata (JP); Takashi Saito, Niigata (JP); Shingo Ikarashi, Niigata (JP)

(73) Assignee: WELCON INC. (JP)

( * ) Notice: Subject to any disclaimer, the term of this patent is extended or adjusted under 35 U.S.C. 154(b) by 232 days.

(21) Appl. No.: 17/253,585

(22) PCT Filed: Jun. 27, 2018

(86) PCT No.: PCT/JP2018/024384
§ 371 (c)(1),
(2) Date: Dec. 17, 2020

(87) PCT Pub. No.: WO2020/003412
PCT Pub. Date: Jan. 2, 2020

(65) Prior Publication Data
US 2021/0270545 A1  Sep. 2, 2021

(51) Int. Cl.
*F28F 3/08* (2006.01)
*F28D 9/00* (2006.01)
(Continued)

(52) U.S. Cl.
CPC ............ *F28F 3/086* (2013.01); *F28D 9/0025* (2013.01); *F28D 9/0037* (2013.01); *F28D 9/04* (2013.01); *F28F 3/046* (2013.01); *F28F 7/02* (2013.01)

(58) Field of Classification Search
CPC ... F28F 7/02; F28F 3/046; F28F 3/086; F28D 9/0037; F28D 9/0025; F24F 3/147; F24F 12/001
See application file for complete search history.

(56) References Cited

U.S. PATENT DOCUMENTS 984,911 A * 2/1911 Harris et al. .......... F28D 9/0037
165/166
2,288,061 A * 6/1942 Arnold .................. F28D 9/0037
165/157
(Continued)

FOREIGN PATENT DOCUMENTS

CN 1851372 A 10/2006
CN 102414534 A 4/2012
(Continued)

OTHER PUBLICATIONS

Extended European Search Report for corresponding Application No. EP 18923906.4 dated May 25, 2021 (7 pages).
(Continued)

*Primary Examiner* — Jianying C Atkisson
*Assistant Examiner* — For K Ling
(74) *Attorney, Agent, or Firm* — Harness, Dickey & Pierce, P.L.C.

(57) ABSTRACT

A heat transport device comprises first flow passages through which a first fluid flows, and second flow passages through which a second fluid flows, wherein a cross-section A satisfying the following Requirement 1 to Requirement 3 can be achieved. Requirement 1 is that the cross-section A is a cross-section perpendicular to the second flow passages. Requirement 2 is that in the cross-section A, the holes of second flow passages are separated by meandering partition plates and are disposed in a layered manner. Two adjacent partition plates are a partition plate B and a partition plate C, and when comparing a point α, which is the top point of a mountain in the partition plate B closest to the partition plate C, and a point β, which is the bottom point of a valley in the partition plate C closest to the partition plate B, the point α is closer to the partition plate C side than the point μ.

(Continued)

Requirement 3 is that the first flow passages are present inside the partition plates.

6 Claims, 12 Drawing Sheets

(51) Int. Cl.
  *F28D 9/04* (2006.01)
  *F28F 3/04* (2006.01)
  *F28F 7/02* (2006.01)

(56) References Cited

U.S. PATENT DOCUMENTS

| | | | | |
|---|---|---|---|---|
| 3,556,202 | A * | 1/1971 | Stockford | F24F 3/147 |
| | | | | 55/293 |
| 3,912,004 | A * | 10/1975 | Darm | F28F 9/0075 |
| | | | | 29/890.039 |
| 4,153,501 | A | 5/1979 | Fink et al. | |
| 4,470,453 | A * | 9/1984 | Laughlin | F28D 9/0012 |
| | | | | 165/DIG. 384 |
| 9,140,498 | B2 * | 9/2015 | Francois | F28D 9/0006 |
| 2002/0185266 | A1 * | 12/2002 | Dobbs | F24F 3/147 |
| | | | | 165/166 |
| 2003/0192681 | A1 | 10/2003 | Yamauchi et al. | |
| 2006/0237178 | A1 | 10/2006 | Katoh et al. | |
| 2012/0043064 | A1 | 2/2012 | Takada et al. | |
| 2012/0125584 | A1 * | 5/2012 | Fini | F28F 3/046 |
| | | | | 165/170 |
| 2016/0377302 | A1 * | 12/2016 | Hamlin | F24F 3/1417 |
| | | | | 165/56 |
| 2017/0056817 | A1 * | 3/2017 | van der Ham | C10L 3/103 |

FOREIGN PATENT DOCUMENTS

| | | | | |
|---|---|---|---|---|
| FR | 2341341 A1 | 9/1977 | | |
| JP | 59066692 A * | 4/1984 | | F24F 13/30 |
| JP | S59-0066692 A | 4/1984 | | |
| JP | S60-002888 A | 1/1985 | | |
| JP | H10-267583 A | 10/1998 | | |
| JP | H11-0147149 A | 6/1999 | | |
| JP | 2003-506306 A | 2/2003 | | |
| JP | 2004-025257 A | 1/2004 | | |
| JP | 2010-117126 A | 5/2010 | | |
| JP | 2018-066534 A | 4/2018 | | |
| KR | 101554910 B1 | 9/2015 | | |
| WO | 2001-010773 A1 | 2/2001 | | |
| WO | 2011-065906 A2 | 6/2011 | | |
| WO | WO-2012120369 A1 * | 9/2012 | | F24H 3/088 |
| WO | WO-2015129936 A1 * | 9/2015 | | B01J 19/249 |

OTHER PUBLICATIONS

International Search Report (English & Japanese) of the International Searching Authority issued in PCT/JP2018/024384, dated Sep. 25, 2018; ISA/JP.

Notice of Reason for Refusal for corresponding Japanese Application No. 2020-526783 dated Jun. 15, 2021, with English Translation (7 Pages).

Chinese Office Action issued for the corresponding Chinese Application No. 201880095010.4 dated Nov. 26, 2021 (total 13 pages).

* cited by examiner

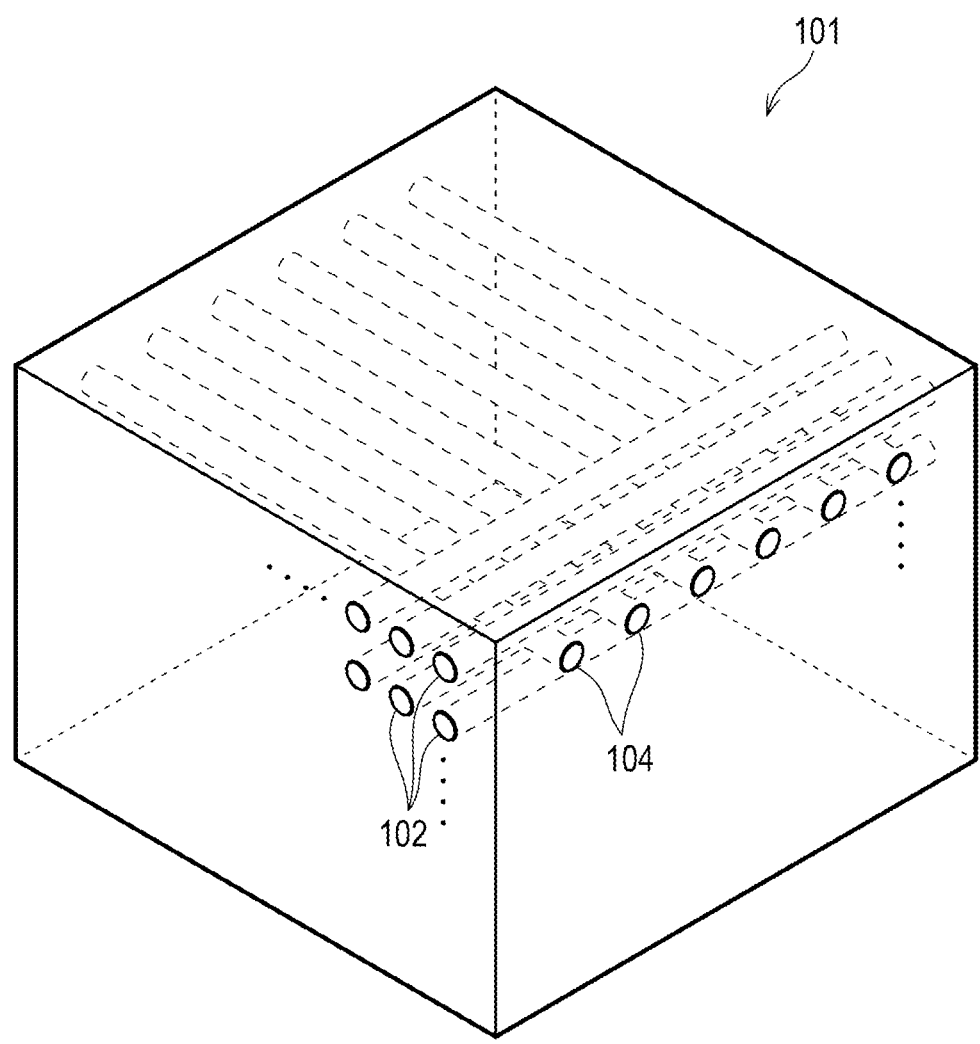

HEAT TRANSPORT DEVICE AND METHOD FOR MANUFACTURING SAME

CROSS REFERENCE TO RELATED APPLICATIONS

This application is a U.S. National Phase application of International Application No. PCT/JP2018/024384, filed on Jun. 27, 2018.

BACKGROUND

TECHNICAL FIELD

The present invention relates to a heat transport device and a method for manufacturing the same.

RELATED ART

Exemplary heat transport devices that function through heat exchange between two fluids include heat exchangers, evaporators, condensers, air conditioner outdoor/indoor units, radiators, reactors, fuel cell-related parts, and parts for use in inkjet printing.

For instance, JP 2003-506306 A describes a heat exchanger shown in FIG. 12. FIG. 12 is a schematic perspective view of a conventional heat exchanger.

A heat exchanger 101 shown in FIG. 12 is formed by diffusion bonding. The heat exchanger is formed by stacking on top of each other plates having a first set of fluid passages 102 formed in one main surface and plates having a second set of fluid passages 104 formed in one main surface in a direction perpendicular to the first set of fluid passages 102 (these sets of fluid passages circulating two different kinds of refrigerants to be heat-exchanged), and integrally joining the plates together through application of pressure and heat in a vacuum. The thus formed heat exchanger 101 is configured to perform heat exchange between a first refrigerant flowing through the first set of fluid passages 102 and a second refrigerant flowing through the second set of fluid passages 104 in the vertically stacked respective plates. In general, the sets of fluid passages 102 and 104 for the refrigerants flowing within the heat exchanger 101 are alternately combined in their stacking direction, as shown in FIG. 12.

The inventors of the present application have examined a method of increasing the heat transmission coefficient between two fluids.

Then, the inventors of the present application assumed that a device has a higher heat transmission coefficient when the first set of fluid passages are not of a linear type as shown in FIG. 12 but are meandering flow passages, and furthermore, the intervals between the plurality of fluid passages in first set are small, and a second fluid flows between the first set of fluid passages located at the small intervals.

It is, however, extremely difficult to obtain a complex flow passage structure while keeping the strength of the whole of the heat exchanger and achieving low costs.

An object of the present invention is to solve the problem as described above.

More specifically, an object of the present invention is to provide a heat transport device in which one set of flow passages meander, the intervals between the set of flow passages are small, and another fluid flows between the set of flow passages located at the small intervals, and the heat transmission coefficient is therefore increased, thus resulting in downsizing, and reduction in weight and thickness. Another object of the present invention is to provide a method of manufacturing the heat transport device as described above having a high strength at low costs.

SUMMARY

The inventors of the present invention have made an intensive study to solve the problem described above and completed the present invention.

The present invention provides the following (1) to (6).

(1) A heat transport device comprising a first set of flow passages for flowing a first fluid and a second set of flow passages for flowing a second fluid, the heat transport device being capable of obtaining a cross-section A satisfying Requirement 1 to Requirement 3 described below:

Requirement 1 is that the cross-section A is a cross-section perpendicular to the second set of flow passages;

Requirement 2 is that at the cross-section A, holes of the second set of flow passages are separated by a plurality of partition plates each having alternating recesses and protrusions, the plurality of partition plates are positioned parallel in a layered form, and when at least a pair of partition plates which are adjacent two partition plates are named partition plate B and partition plate C, respectively, and a point which is a top of a protrusion nearest to the partition plate C at a surface of the partition plate B is compared with a point β which is a top of a protrusion nearest to the partition plate B at a surface of the partition plate C, the point α is present on a side nearer to the partition plate C than the point β; and Requirement 3 is that the first set of flow passages are present inside the partition plates and the first set of flow passages are not parallel to the second set of flow passages.

(2) A method of manufacturing a heat transport device, the method comprising:

a flat plate working process including removing at least a part of a main surface of a flat plate P to form recesses at the main surface, thereby obtaining a processed flat plate Q including in its main surface a processed portion which is a portion having the recesses formed therein;

a first joining process including bringing a main surface of a flat plate R for upper surface and the main surface of the processed flat plate Q into close contact with each other so as to form, between the flat plate R for upper surface and the processed flat plate Q, a first set of flow passages for flowing a first fluid that are formed at the processed portion, and joining together the main surfaces of the flat plate R for upper surface and the processed flat plate Q, thereby obtaining a first flow passage plate;

a plastic working process including subjecting at least a part of a main surface of the first flow passage plate to plastic working so as to deform the first set of flow passages to form recesses at the main surface, thereby obtaining a second flow passage plate including in its main surface a plastically deformed portion which is a portion having the recesses formed therein; and a second joining process including stacking thus formed second flow passage plates on top of each other and joining together main surfaces of the second flow passage plates through spacers, respectively, thus forming, between one second flow passage plate and another second flow passage plate, a second set of flow passage which is not parallel to the first set of flow passages and where a second fluid flows.

(3) A method of manufacturing a heat transport device, the method comprising:
a flat plate working process including subjecting at least a part of a main surface of a flat plate P to plastic working to form recesses at the main surface, thereby obtaining a processed flat plate Q including in its main surface a processed portion which is a portion having the recesses formed therein;
a first joining process including preparing a flat plate-like spacer X which is processed so as not to have a portion in contact with the processed portion even after a main surface of the spacer and the main surface of the processed flat plate Q are brought into close contact with each other, bringing the main surfaces of the processed flat plate Q and the spacer X into contact with each other, sandwiching the spacer X and the processed flat plate Q between a flat plate R for upper surface and a flat plate S for lower surface, and then joining together main surfaces of the flat plate R for upper surface, the processed flat plate Q, the spacer X, and the flat plate S for lower surface so that there is no space between the flat plate R for upper surface and the flat plate S for lower surface in a portion where the processed portion is not present but only the spacer X is present between the flat plate R for upper surface and the flat plate S for lower surface, and a first set of flow passages for flowing a first fluid are formed between the flat plate R for upper surface and the flat plate S for lower surface in a portion where the processed portion is present but the spacer X is not present between the flat plate R for upper surface and the flat plate S for lower surface, thereby obtaining a first flow passage plate;
a plastic working process including subjecting at least a part of a main surface of the first flow passage plate to plastic working so as to deform the first set of flow passages to form recesses at the main surface, thereby obtaining a second flow passage plate including in its main surface a plastically deformed portion which is a portion having the recesses formed therein; and
a second joining process including stacking thus formed second flow passage plates on top of each other and joining together main surfaces of the second flow passage plates through spacers, respectively, thus forming, between one second flow passage plate and another second flow passage plate, a second set of flow passage which is not parallel to the first set of flow passages and where a second fluid flows.

(4) The method of manufacturing a heat transport device according to (2) or (3) above,
wherein the method comprises, in the second joining process, operations including:
preparing a flat plate-like spacer Y processed so as not to have a portion in contact with the plastically deformed portion even after a main surface of the flat plate-like spacer and the main surface of its corresponding second flow passage plate are brought into close contact with each other; and
stacking a first plate serving as the second flow passage plate, a first member serving as the spacer Y, a second plate serving as the second flow passage plate, and a second member serving as the spacer Y on top of each other in this order; and joining their respective main surfaces together.

(5) The method of manufacturing a heat transport device according to any one of (2) to (4) above,
wherein, in the first joining process, the main surfaces of at least two selected from the group consisting of the flat plate R for upper surface, the processed flat plate Q, the flat plate S for lower surface, and the spacer X are joined together by diffusion bonding.

(6) The method of manufacturing a heat transport device according to any one of (2) to (5) above,
wherein, in the second joining process, the main surfaces of the second flow passage plates and main surfaces of the spacers Y are joined together by diffusion bonding.

EFFECT OF THE INVENTION

The present invention can provide a heat transport device in which one set of flow passages meander, the intervals between the set of flow passages are small, and another fluid flows between the set of flow passages located at the small intervals, and the heat transmission coefficient is therefore increased, thus resulting in downsizing, and reduction in weight and thickness. The present invention can also provide a method of manufacturing the heat transport device as described above having a high strength at low costs.

BRIEF DESCRIPTION OF THE DRAWINGS

FIG. 12 is a schematic perspective view of a conventional heat exchanger.

DETAILED DESCRIPTION

Figure 1A:
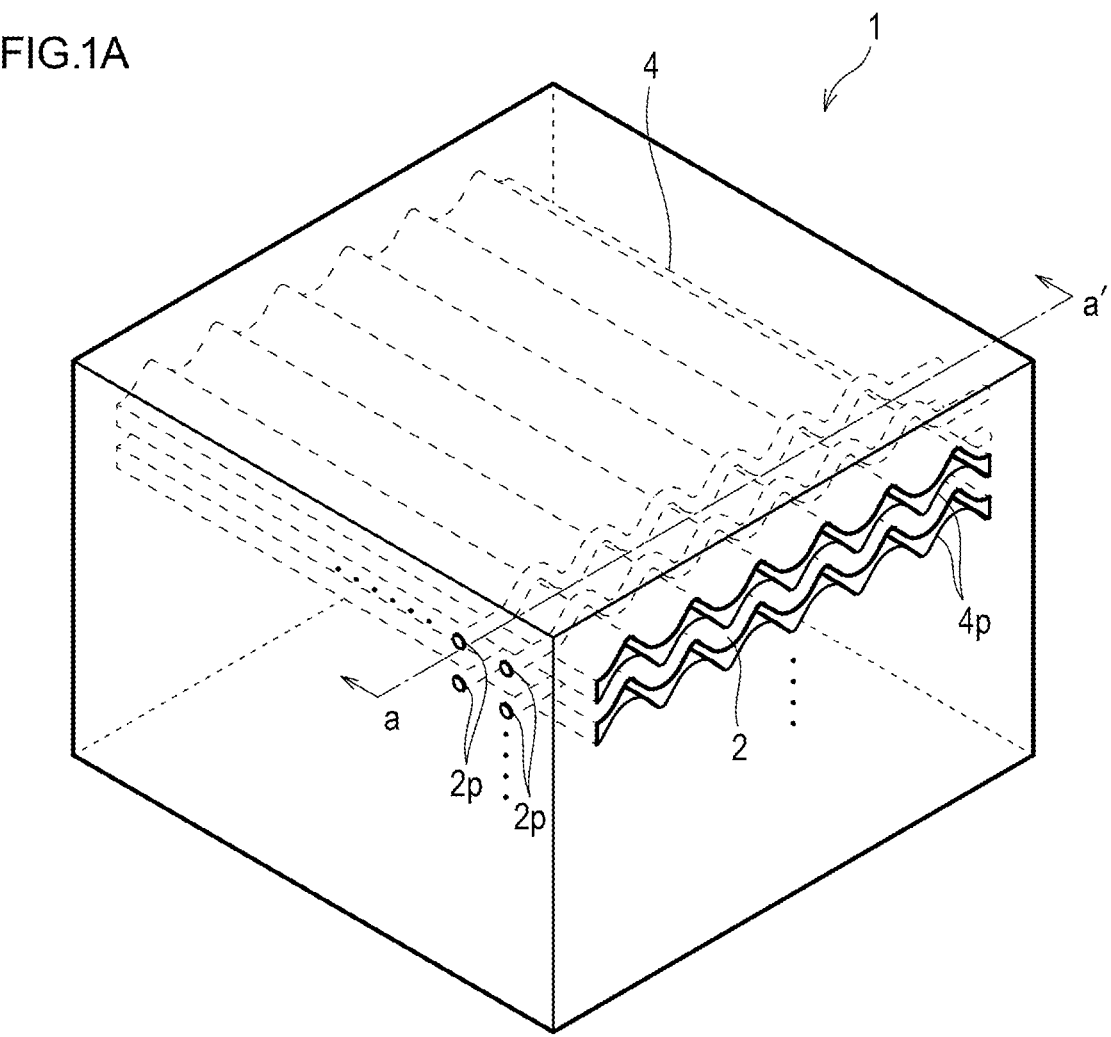
FIG. 1A illustrates a schematic perspective view of a device of the invention.

The present invention is now described.

The present invention is directed to a heat transport device including a first set of flow passages for flowing a first fluid and a second set of flow passages for flowing a second fluid.

The heat transport device is capable of obtaining a cross-section A satisfying Requirement 1 to Requirement 3 described below.

Requirement 1. The cross-section A is a cross-section perpendicular to the second set of flow passages.

Requirement 2. At the cross-section A, holes of the second set of flow passages are separated by a plurality of partition plates each having alternating recesses and protrusions, the plurality of partition plates are positioned parallel in a layered form, and when at least a pair of partition plates which are adjacent two partition plates are named partition plate B and partition plate C, respectively, and a point a which is a top of a protrusion nearest to the partition plate C at a surface of the partition plate B is compared with a point β which is a top of a protrusion nearest to the partition plate B at a surface of the partition plate C, the point α is present on a side nearer to the partition plate C than the point β.

Requirement 3. The first set of flow passages are present inside the partition plates and the first set of flow passages are not parallel to the second set of flow passages.

The heat transport device as described above is hereinafter referred to also as "device of the invention."

The present invention is also directed to a method of manufacturing a heat transport device, the method comprising: a flat plate working process including removing at least a part of a main surface of a flat plate P to form recesses at the main surface, thereby obtaining a processed flat plate Q including in its main surface a processed portion which is a portion having the recesses formed therein; a first joining process including bringing a main surface of a flat plate R for upper surface and the main surface of the processed flat plate Q into close contact with each other so as to form, between the flat plate R for upper surface and the processed flat plate Q, a first set of flow passages for flowing a first fluid that are formed at the processed portion, and joining together the main surfaces of the flat plate R for upper surface and the processed flat plate Q, thereby obtaining a first flow passage plate; a plastic working process including subjecting at least a part of a main surface of the first flow passage plate to plastic working so as to deform the first set of flow passages to form recesses at the main surface, thereby obtaining a second flow passage plate including in its main surface a plastically deformed portion which is a portion having the recesses formed therein; and a second joining process including stacking thus formed second flow passage plates on top of each other and joining together main surfaces of the second flow passage plates through spacers, respectively, thus forming, between one second flow passage plate and another second flow passage plate, a second set of flow passage which is not parallel to the first set of flow passages and where a second fluid flows.

The method of manufacturing the heat transport device as described above is hereinafter referred to also as "first manufacturing method of the invention."

The present invention is further directed to a method of manufacturing a heat transport device, the method comprising: a flat plate working process including subjecting at least a part of a main surface of a flat plate P to plastic working to form recesses at the main surface, thereby obtaining a processed flat plate Q including in its main surface a processed portion which is a portion having the recesses formed therein; a first joining process including preparing a flat plate-like spacer X which is processed so as not to have a portion in contact with the processed portion even after a main surface of the spacer and the main surface of the processed flat plate Q are brought into close contact with each other, bringing the main surfaces of the processed flat plate Q and the spacer X into contact with each other, sandwiching the spacer X and the processed flat plate Q between a flat plate R for upper surface and a flat plate S for lower surface, and then joining together main surfaces of the flat plate R for upper surface, the processed flat plate Q, the spacer X, and the flat plate S for lower surface so that there is no space between the flat plate R for upper surface and the flat plate S for lower surface in a portion where the processed portion is not present but only the spacer X is present between the flat plate R for upper surface and the flat plate S for lower surface, and a first set of flow passages for flowing a first fluid are formed between the flat plate R for upper surface and the flat plate S for lower surface in a portion where the processed portion is present but the spacer X is not present between the flat plate R for upper surface and the flat plate S for lower surface, thereby obtaining a first flow passage plate; a plastic working process including subjecting at least a part of a main surface of the first flow passage plate to plastic working so as to deform the first set of flow passages to form recesses at the main surface, thereby obtaining a second flow passage plate including in its main surface a plastically deformed portion which is a portion having the recesses formed therein; and a second joining process including stacking thus formed second flow passage plates on top of each other and joining together main surfaces of the second flow passage plates through spacers, respectively, thus forming, between one second flow passage plate and another second flow passage plate, a second set of flow passage which is not parallel to the first set of flow passages and where a second fluid flows.

The method of manufacturing the heat transport device as described above is hereinafter referred to also as "second manufacturing method of the invention."

The term "the manufacturing method of the invention" simply used in the following description refers to both "the first manufacturing method of the invention" and "the second manufacturing method of the invention."

The device of the invention can be preferably manufactured by the manufacturing method of the invention.

Device of the invention

The device of the invention is first described.

The device of the invention is a heat transport device including a first set of flow passages for flowing a first fluid and a second set of flow passages for flowing a second fluid, and can be preferably used as a heat exchanger included in, for example, refrigerating equipment and air-conditioning equipment. In addition, the device can also be used as a cooling device that may be used to cool electronic equipment such as computers.

The first fluid and the second fluid are not particularly limited, and, for example, a conventionally known refrigerant can be used. Specifically, water (pure water and the like), alcohols (ethanol and the like), chlorofluorocarbons (CFCs) and CFC substitutes can be used.

There is no particular limitation on the cross-sectional shape and the diameter of the first set of flow passages and the second set of flow passages. For example, the first set of flow passages may have a substantially circular cross-sectional shape and a diameter (Heywood diameter) of 0.05 to 5 mm. The diameter is preferably 0.2 to 2 mm.

The first set of flow passages and the second set of flow passages preferably have a smaller shortest distance therebetween because the heat transmission coefficient can be increased. On the other hand, the first set of flow passages and the second set of flow passages preferably have a larger shortest distance therebetween because the strength of the device of the invention can be increased. An optimal value can be selected for the distance between the first set of flow passages and the second set of flow passages depending on the performance required for the device of the invention. For example, the first set of flow passages and the second set of flow passages may have therebetween a shortest distance of 0.05 to 1 mm, and preferably have therebetween a shortest distance of 0.1 to 0.3 mm.

Schematic views are used to describe the device of the invention.

Figure 1B:
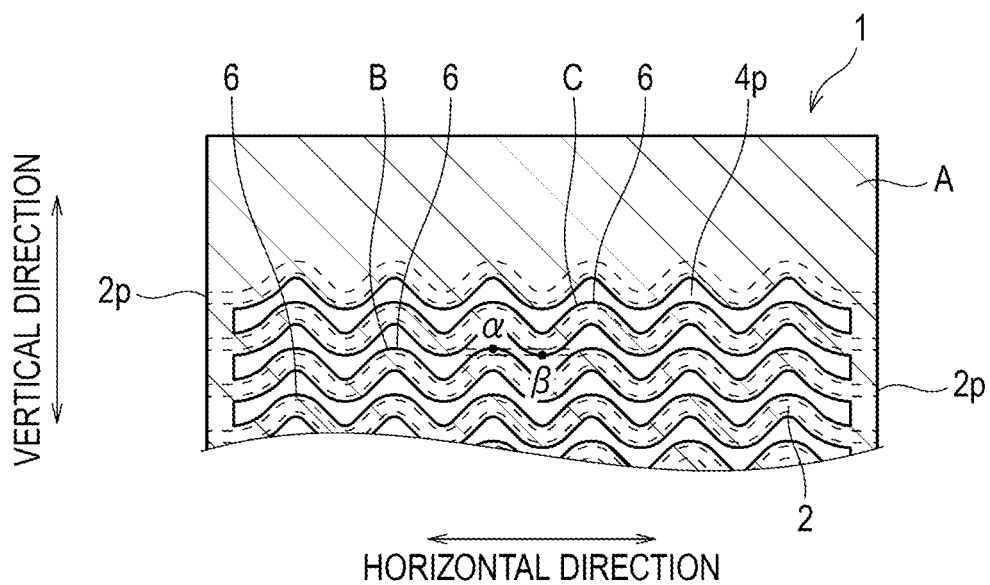
FIG. 1B is a cross-sectional view taken along line a-a' in FIG. 1A.

FIG. 1A shows a schematic perspective view of the device of the invention, and FIG. 1B shows a cross-sectional view taken along line a-a' in FIG. 1A.

In a device 1 of the invention illustrated in FIGS. 1A and 1B, as shown in FIG. 1A, a first set of flow passages 2 for flowing a first fluid are approximately perpendicular to a second set of flow passages 4 for flowing a second fluid.

However, in the device of the invention, the first set of flow passages 2 for flowing the first fluid may not be perpendicular to the second set of flow passages 4 for flowing the second fluid.

Figure 2A:
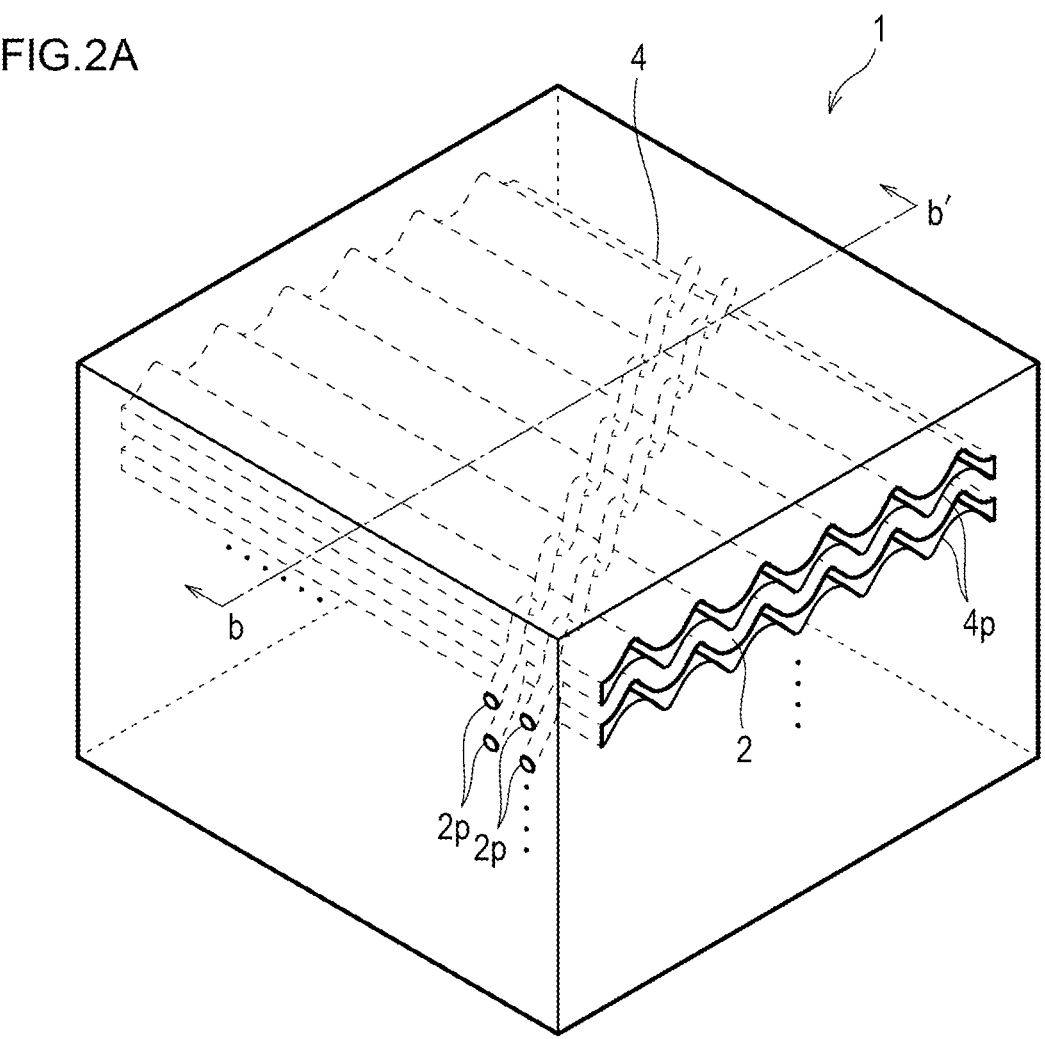
FIG. 2A illustrates a schematic perspective view of another device of the invention.
Figure 2B:
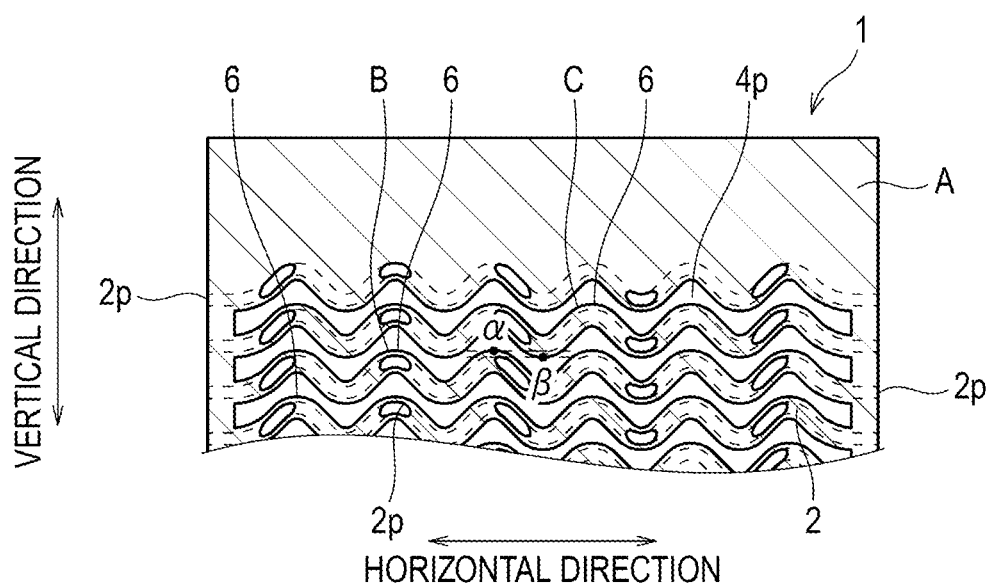
FIG. 2B is a cross-sectional view taken along line b-b' in FIG. 2A.

For instance, the first set of flow passages 2 may be formed in a direction non-perpendicular to the second set of flow passages 4 as in the device of the invention illustrated in FIGS. 2A and 2B.

Figure 3A:
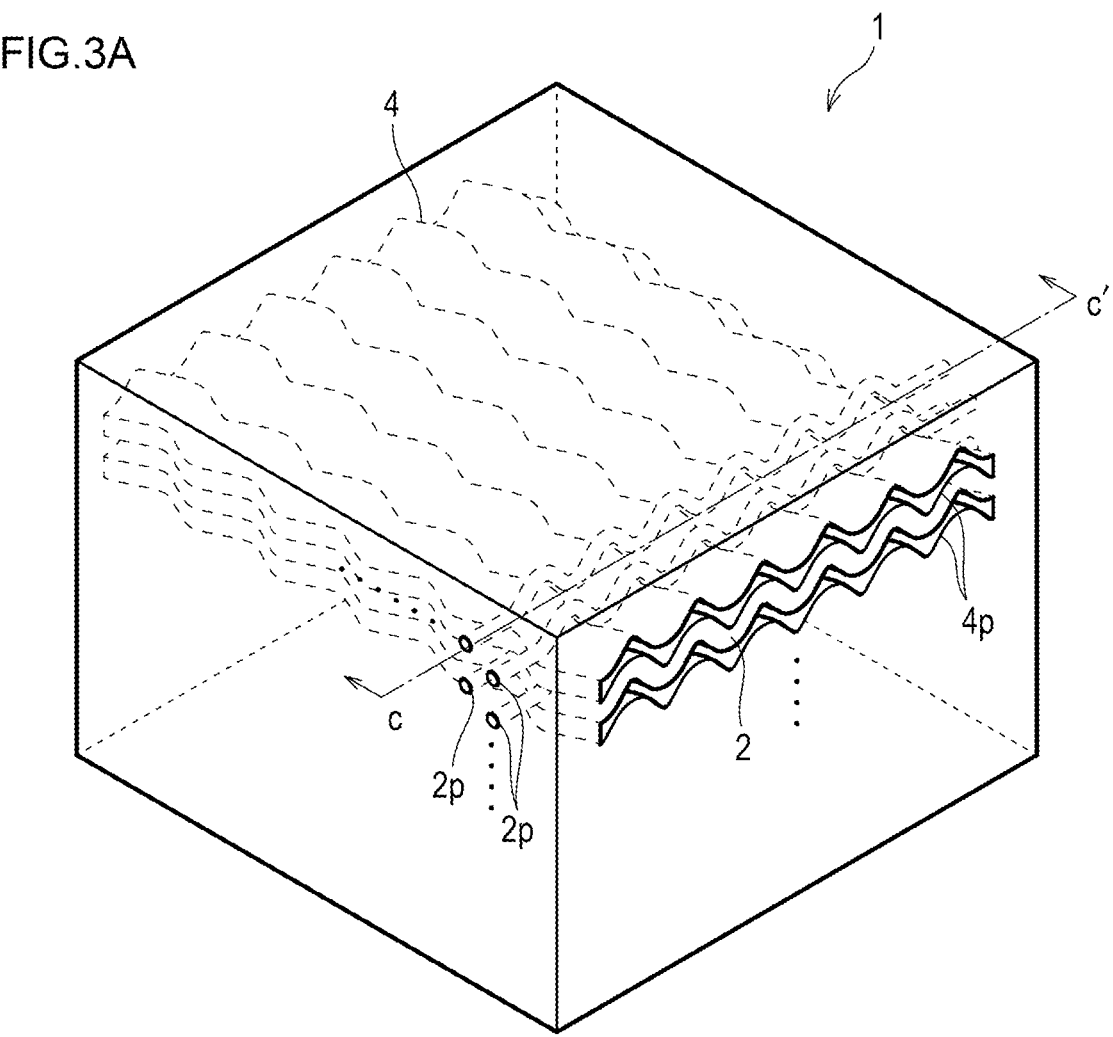
FIG. 3A illustrates a schematic perspective view of still another device of the invention.
Figure 3B:
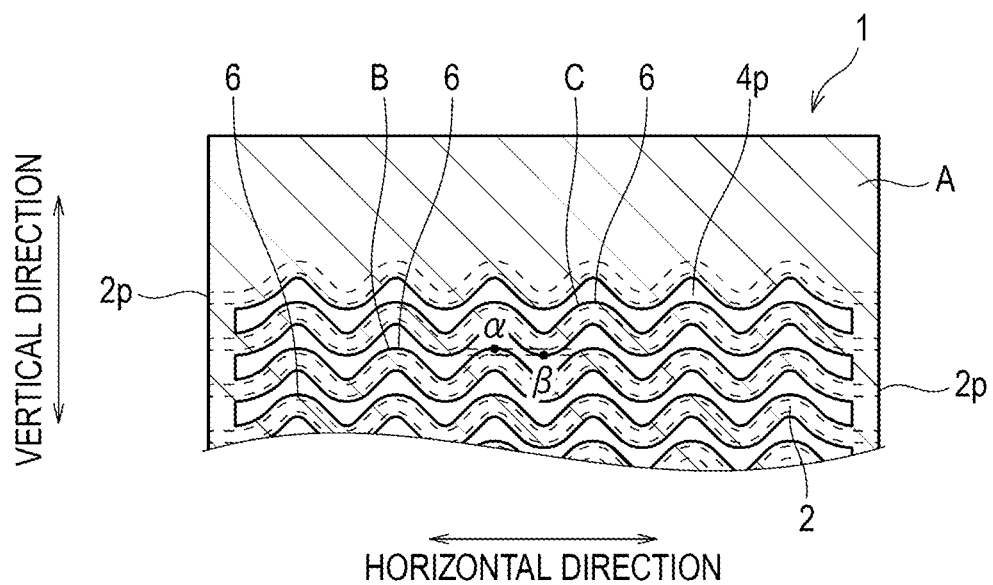
FIG. 3B is a cross-sectional view taken along line c-c' in FIG. 3A.

For instance, the second set of flow passages 4 may have a zigzag (herringbone pattern) shape as in the device of the invention illustrated in FIGS. 3A and 3B.

In FIGS. 1A to 3B, "2*p*" denotes an inlet hole or outlet hole of each flow passage in the first set, or a hole of each flow passage in the first set emerging at the cross-section, and "4*p*" denotes an inlet hole or outlet hole of each flow passage in the second set.

The device of the invention is a heat transport device that is capable of obtaining a cross-section A satisfying Requirement 1 to Requirement 3 described below.

Requirement 1

In the devices of the invention as illustrated in FIGS. 1A to 3B, the cross-sections A as illustrated in FIG. 1B, FIG. 2B, and FIG. 3B can be obtained by cutting the devices of the invention in a direction perpendicular to the second sets of flow passages.

The cross-section A may not be a cross-section in a direction perpendicular to all the second set of flow passages in the device of the invention. Depending on the configuration of the second set of flow passages, a cross-section perpendicular to all the second set of flow passages may not be obtained. In such a case, a cross-section in a direction perpendicular to some flow passages of the second set in the device of the invention (to the largest possible number of flow passages of the second set in the device of the invention) is taken as the cross-section A in the device of the invention.

For instance, in the case of the device 1 of the invention shown in FIGS. 1A and 1B, the second set of flow passages are linearly formed and therefore a cross-section in a direction perpendicular to the set of flow passages, namely the cross-section taken along line a-a' in FIG. 1A is the cross-section A and is shown in FIG. 1B.

Also in the case of, for instance, the device 1 of the invention shown in FIGS. 2A and 2B, the second set of flow passages are linearly formed and therefore a cross-section in a direction perpendicular to the set of flow passages, namely a cross-section taken along line b-b' in FIG. 2A is the cross-section A and is shown in FIG. 2B. In the case in which the first set of flow passages 2 are formed in an oblique direction with respect to the second set of flow passages 4 as shown in FIG. 2A, the cross-section A may have a plurality of holes 2*p* in the first set of flow passages as shown in FIG. 2B. For ease of understanding, positions of the first set of flow passages 2 (or lines assuming the first set of flow passages 2 are seen through the cross-section A) are shown in dotted lines in FIG. 2B, but in the case of FIG. 2B, only the holes 2*p* of the first set of flow passages 2 should actually appear on FIG. 2B.

For instance, in the case of the device 1 of the invention shown in FIGS. 3A and 3B, the second set of flow passages are not linearly formed. It is, however, possible to obtain a cross-section in a direction perpendicular to the set of flow passages. Namely, a cross-section taken along line c-c' in FIG. 3A is the cross-section A and is shown in FIG. 3B.

Figure 4:
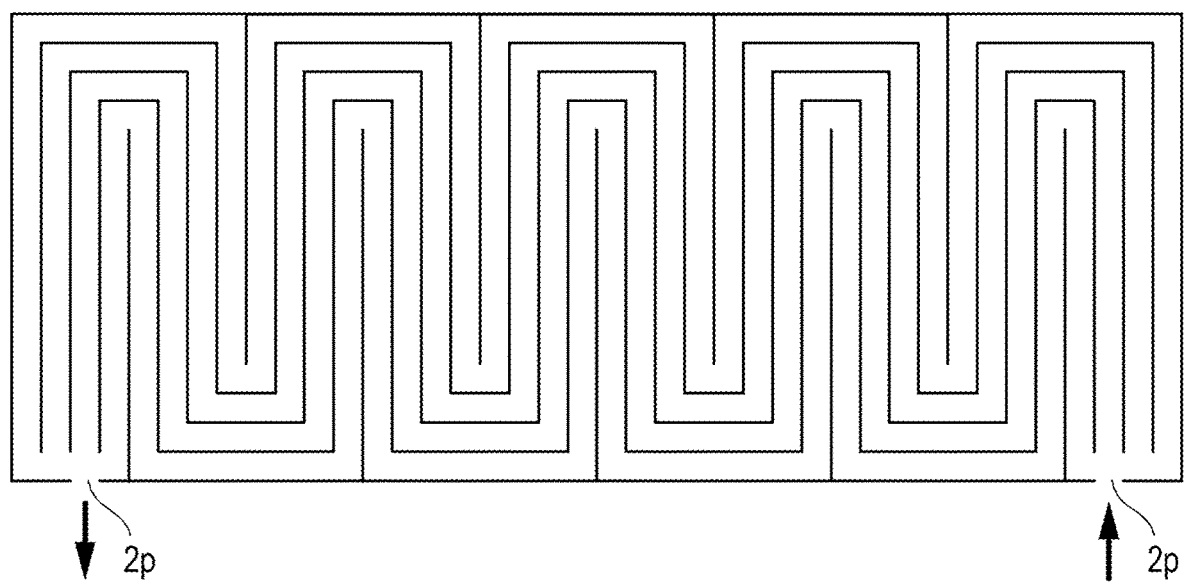
FIG. 4 is a diagram illustrating a configuration example of a first set of flow passages assuming that the first set of flow passages are only seen from above of the device of the invention.

For ease of understanding, the first sets of flow passages and the second sets of flow passages in FIGS. 1A to 3B illustrate flow passages having extremely simple configurations, respectively. For instance, when the first set of flow passages are only seen from above the device of the invention, the device may also have flow passages as shown in FIG. 4. The first set of flow passages and the second set of flow passages may have other shapes such as a corrugated pattern (parallel wave pattern) shape, a herringbone pattern (herring-bone pattern) shape, and a double herringbone pattern shape.

Requirement 2

As illustrated in FIG. 1B, FIG. 2B, and FIG. 3B, in the cross-section A of the device of the invention, the holes (4*p*) of the second set of flow passages are separated by a plurality of partition plates 6 each having alternating recesses and protrusions, and the plurality of partition plates are positioned parallel in a layered form. Parallel as used herein refers to substantially parallel.

At least a pair of partition plates 6 which are adjacent two partition plates are named partition plate B and partition plate C, respectively. The top of a protrusion nearest to the partition plate C at the surface of the partition plate B is taken as point α. The top of a protrusion nearest to the partition plate B at the surface of the partition plate C is taken as point β.

In the above-mentioned device of the invention, when the point α is compared with the point β, the point α is present on the side nearer to the partition plate C than the point β as shown in FIG. 1B, FIG. 2B, and FIG. 3B. This means that the intervals between the partition plates are very small and the heat transmission coefficient of the device of the invention is thereby increased.

In almost all or all of cases, the adjacent two partition plates 6 preferably have the above-mentioned state, more specifically the state in which the point α is present on the side nearer to the partition plate C than the point β.

Requirement 3

In the device of the invention, as shown in FIG. 1B, FIG. 2B, and FIG. 3B, the first set of flow passages 2 are present inside the partition plates 6. As shown in these drawings, the first set of flow passages 2 are present inside the partition plates each having the alternating recesses and protrusions, and therefore the first set of flow passages also meander along the shape of the partition plates.

The first set of flow passages 2 are not parallel to the second set of flow passages 4. In other words, the direction in which the first fluid flows is not parallel to the direction in which the second fluid flows.

In the device of the invention as described above, one set of flow passages meander, the intervals between the set of flow passages are small, and another fluid flows between the set of flow passages located at the small intervals, and the heat transmission coefficient is therefore increased, thus resulting in downsizing, and reduction in weight and thickness.

Figure 5:
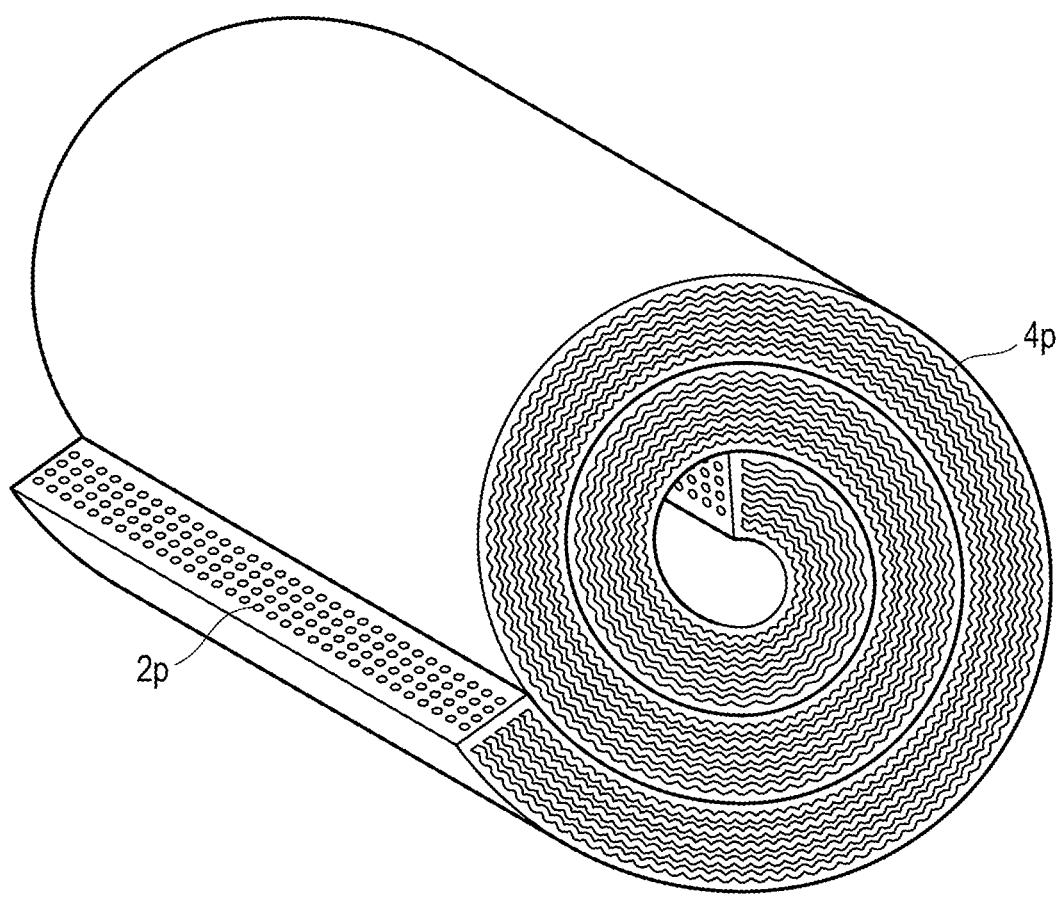
FIG. 5 illustrates a schematic perspective view of the device of the invention.

The device of the invention may have a plate-like shape. However, the shape of the device of the invention having a plate-like shape may also be changed to have, for example, a cylindrical shape as shown in FIG. 5.

Manufacturing method of the invention

Next, the manufacturing method of the invention is described.

The device of the invention as described above can be preferably manufactured by the manufacturing method of the invention.

The manufacturing method of the invention includes a flat plate working process, a first joining process, a plastic working process, and a second joining process.

Flat plate working process

The flat plate working process in the manufacturing method of the invention is described with reference to FIGS. 6A, 6B, 7A, and 7B.

Figure 6B:
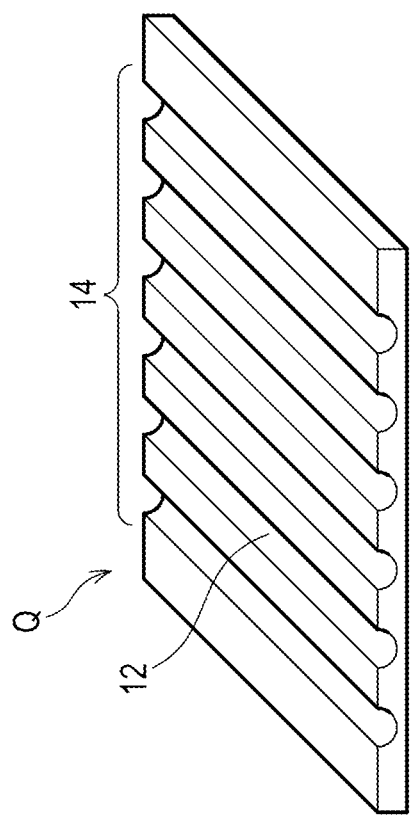
FIGS. 6A and 6B are schematic views for illustrating a flat plate working process in a manufacturing method of the invention.
Figure 6A:
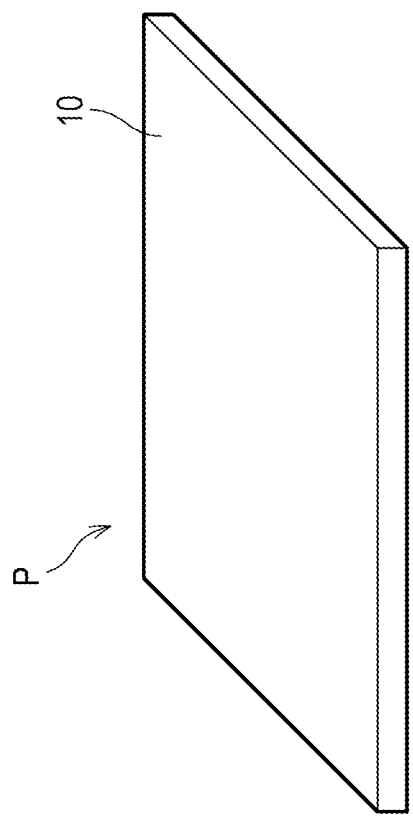
Figure 7B:
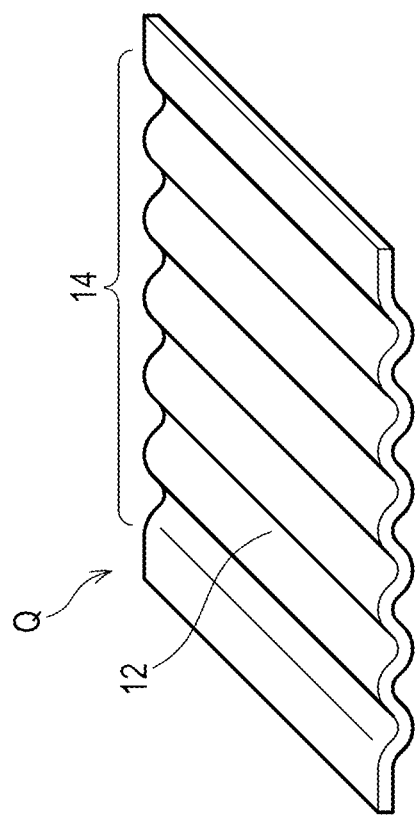
FIGS. 7A and 7B are schematic views for illustrating another flat plate working process in the manufacturing method of the invention.
Figure 7A:
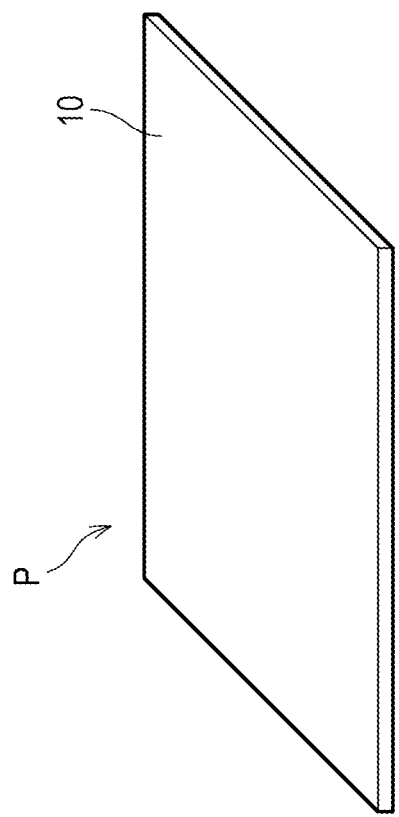

In the flat plate working process, a flat plate P is first prepared (FIG. 6A, FIG. 7A).

The flat plate P is preferably a metallic flat plate, and more preferably a flat plate made of stainless steel, aluminum, iron, steel, copper, titanium, Inconel or Hastelloy.

The size and the thickness are not particularly limited and the flat plate preferably has a thickness of about 0.05 to 5 mm, and more preferably about 0.2 to 2 mm.

Next, at least a part of a main surface of the flat plate P is processed to form recesses at the main surface.

For instance, as shown in FIG. 6B and FIG. 7B, at least a part of a main surface 10 of the flat plate P is processed to form recesses 12 at the main surface 10.

A processed flat plate Q that includes, in the main surface 10, a processed portion 14 which is a portion having the recesses formed therein is thus obtained.

In a first manufacturing method of the invention, at least a part of the main surface of the flat plate P is removed to form recesses at the main surface.

Removal processing refers to removing at least a part of the main surface of the flat plate P and is not particularly limited as long as the process used is capable of forming recesses at the main surface. Etching processing or cutting machining is preferably used for removal processing.

The recesses 12 shown in FIG. 6B indicate recesses in the case of removal processing.

In a second manufacturing method of the invention, at least a part of the main surface of the flat plate P is subjected to plastic working to form recesses at the main surface.

Plastic working refers to plastically deforming at least a part of the main surface of the flat plate P and is not particularly limited as long as the process used is capable of forming recesses at the main surface. Press working or processing using gear rolls is preferably used for plastic working. The processing using gear rolls refers to a process in which a metallic plate or band is inserted between two gear rolls and processed, and exemplary methods are illustrated in JP 11-147149 A and JP 2004-025257 A.

The recesses 12 shown in FIG. 7B indicate recesses in the case of plastic working.

First joining process

Next, the first joining process in the first manufacturing method of the invention is described with reference to FIGS. 8A to 8C.

Figure 8C:
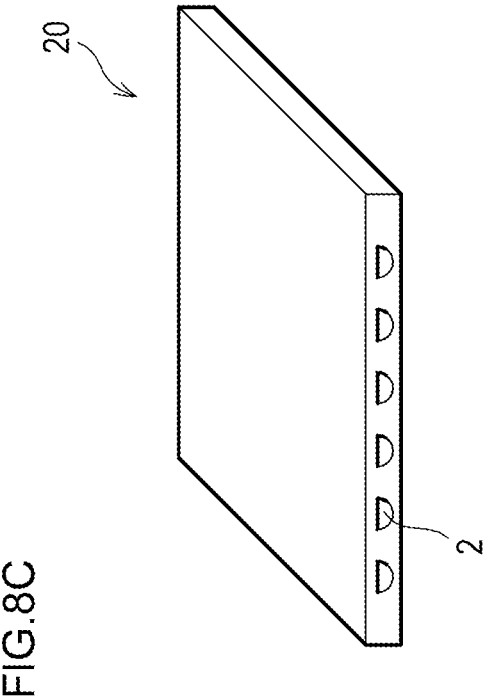
FIGS. 8A to 8C are schematic views for illustrating a first joining process in the manufacturing method of the invention.
Figure 8B:
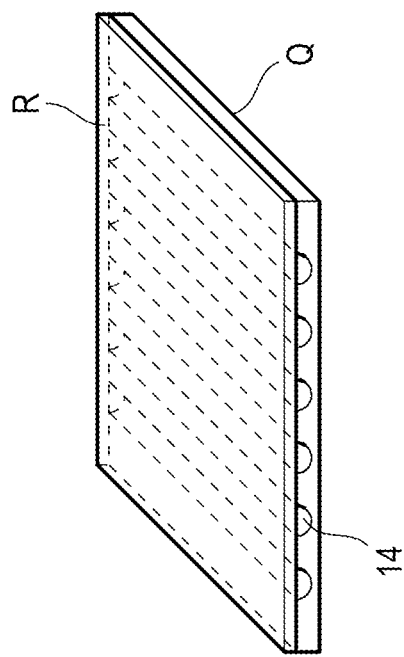
Figure 8A:
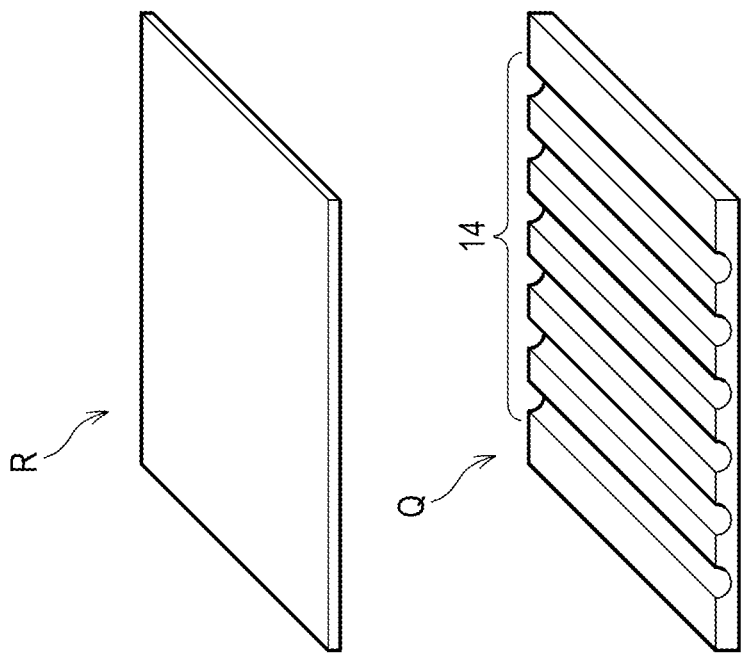

In the first joining process in the first manufacturing method of the invention, a flat plate R for upper surface is first prepared (FIG. 8A).

The material, the size, the thickness and the like of the flat plate R for upper surface are not particularly limited and are preferably the same as those in the above-mentioned flat plate P.

Next, main surfaces of the flat plate R for upper surface and a processed flat plate Q are brought into close contact with each other (FIG. 8B). The main surface of the processed flat plate Q having recesses at the processed portion 14 is opposed to and brought into close contact with the flat plate R for upper surface.

Then, the main surfaces of the flat plate R for upper surface and the processed flat plate Q are joined together, whereby a first flow passage plate 20 having, between the flat plate R for upper surface and the processed flat plate Q, a first set of flow passages 2 formed at the processed portion 14 can be obtained (FIG. 8C).

Next, the first joining process in the second manufacturing method of the invention is described with reference to FIGS. 9A to 9C.

Figure 9B:
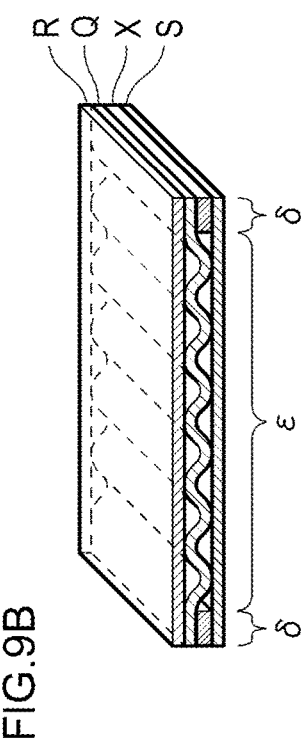
FIGS. 9A to 9C are schematic views for illustrating another first joining process in the manufacturing method of the invention.
Figure 9C:
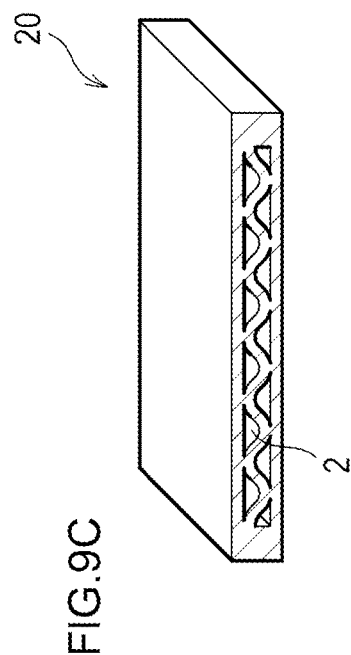
Figure 9A:
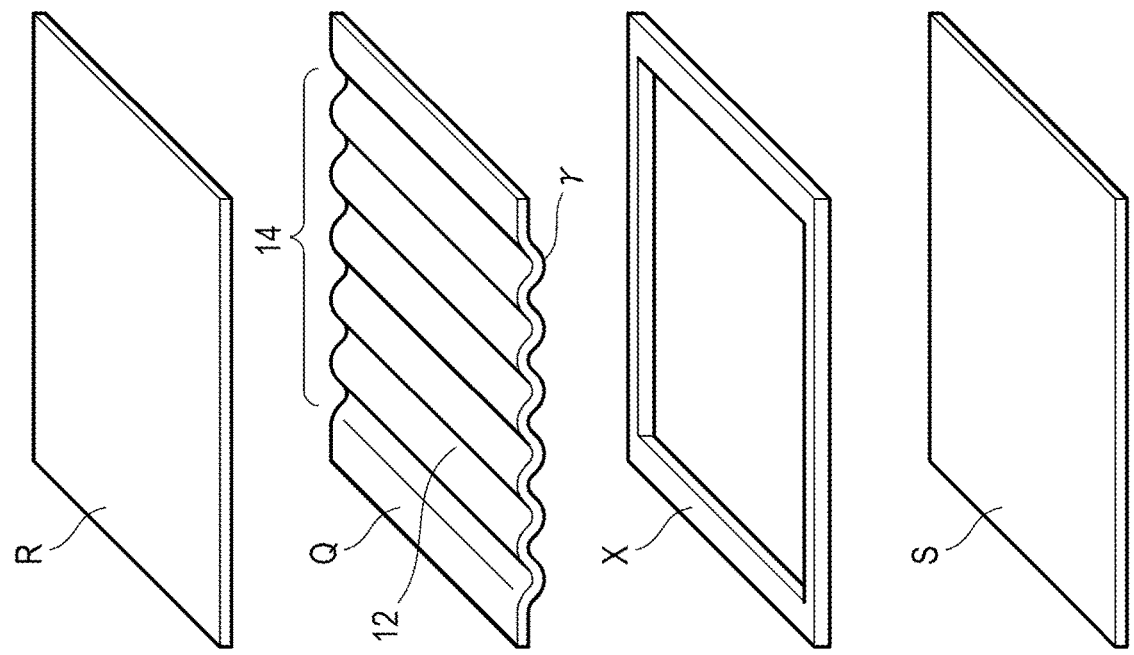

In the first joining process in the second manufacturing method of the invention, a flat plate R for upper surface and a flat plate S for lower surface are first prepared (FIG. 9A).

The material, the size, the thickness and the like of the flat plate R for upper surface and the flat plate S for lower surface are not particularly limited and are preferably the same as those in the above-mentioned flat plate P.

A flat plate-like spacer X which is processed so as not to have a portion in contact with the processed portion 14 even after main surfaces of the spacer and a processed flat plate Q are brought into close contact with each other is prepared (FIG. 9A).

For instance, the spacer X can be obtained by preparing a plate which is made of the same material as that of the flat plate R for upper surface and has a slightly larger size than that of the flat plate R for upper surface, and punching the prepared plate.

The processed portion 14 of the processed flat plate Q is formed by plastic working such as press working, and therefore recesses (recesses 12) are formed at one main surface of the processed flat plate Q and protrusions γ are formed at the other main surface of the processed flat plate Q. Then, the thickness of the spacer X is adjusted depending on the size of the protrusions γ of the processed flat plate Q. More specifically, the thickness of the processed flat plate Q is adjusted so that the tops of the protrusions γ do not come into contact with the flat plate S for lower surface in the state of FIG. 9B to be described later. However, the thickness of the processed flat plate Q is preferably adjusted so that the tops of the protrusions γ come into contact with a main surface of the flat plate S for lower surface in the state of FIG. 9B to be described later. The tops of the protrusions γ and the main surface of the flat plate S for lower surface are joined together to obtain a heat transport device having a higher strength, which is preferable.

Next, the main surfaces of the processed flat plate Q and the spacer X are brought into contact with each other. As illustrated in FIG. 9A, the main surface of the processed flat plate Q on the side of the protrusions γ at the processed portion 14 is brought into contact with the main surface of the spacer X.

Then, the spacer X and the processed flat plate Q are sandwiched between the flat plate R for upper surface and the flat surface S for lower surface to obtain the state shown in FIG. 9B. FIG. 9B shows a drawing in the state obtained by cutting in a direction which is parallel to the longitudinal direction (horizontal direction in the drawing) of the flat plate R for upper surface and the flat plate S for lower surface and is perpendicular to the main surfaces.

In this case, the flat plate R for upper surface and the flat plate S for lower surface preferably have no space therebetween in the portion where the processed portion 14 is not present but the spacer X is only present between the flat plate R for upper surface and the flat plate S for lower surface (portion indicated by δ in FIG. 9B). Then, when the main surfaces of the flat plate R for upper surface, the processed flat plate Q, the spacer X, and the flat plate S for lower surface are joined together, a first flow passage plate 20 can be obtained which includes a first set of flow passages 2 for flowing a first fluid between the flat plate R for upper surface and the flat plate S for lower surface in the portion (portion indicated by ε in FIG. 9B) where the processed portion is present but the spacer X is not present between the flat plate R for upper surface and the flat plate S for lower surface (FIG. 9C).

In the first joining process in the manufacturing method of the invention as described above, the main surfaces of at least two selected from the group consisting of the flat plate R for upper surface, the processed flat plate Q, the flat plate S for lower surface, and the spacer X are preferably joined together by diffusion bonding.

In the first joining process in the first manufacturing method of the invention, the main surfaces of the flat plate R for upper surface and the processed flat surface Q can be joined together by brazing or the like but are preferably joined together by diffusion bonding.

In the first joining process in the second manufacturing method of the invention, the main surfaces of at least two selected from the group consisting of the flat plate R for upper surface, the processed flat plate Q, the flat plate S for lower surface, and the spacer X can be joined together by brazing or the like but are preferably joined together by diffusion bonding. The main surfaces of the flat plate R for upper surface, the processed flat plate Q, the flat plate S for lower surface, and the spacer X are more preferably joined together by diffusion bonding.

The obtained heat transport device has thus a higher strength.

Plastic working process

Next, the plastic working process in the manufacturing method of the invention is described with reference to FIGS. 10A and 10B.

In the plastic working process, a first flow passage plate is prepared. Although the first flow passage plate 20 shown in FIG. 9C is illustrated, the first flow passage plate 20 shown in FIG. 8C may be used.

Figure 10B:
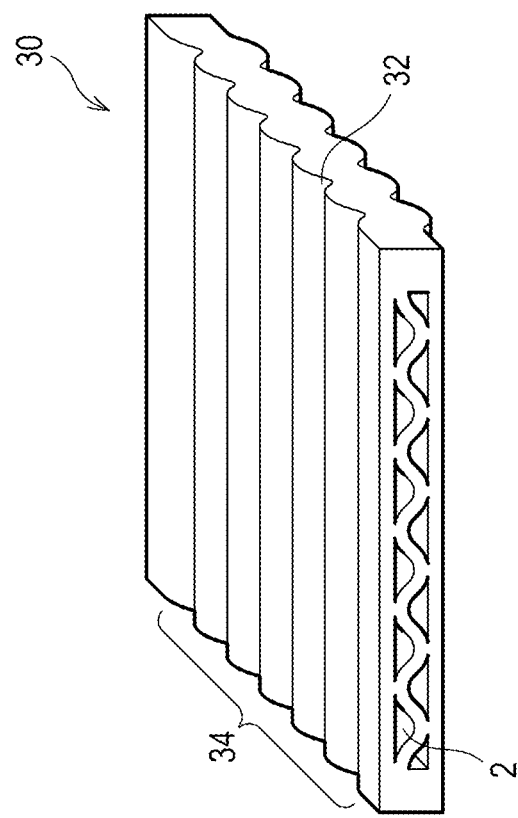
FIGS. 10A and 10B are schematic views for illustrating a plastic working process in the manufacturing method of the invention.
Figure 10A:
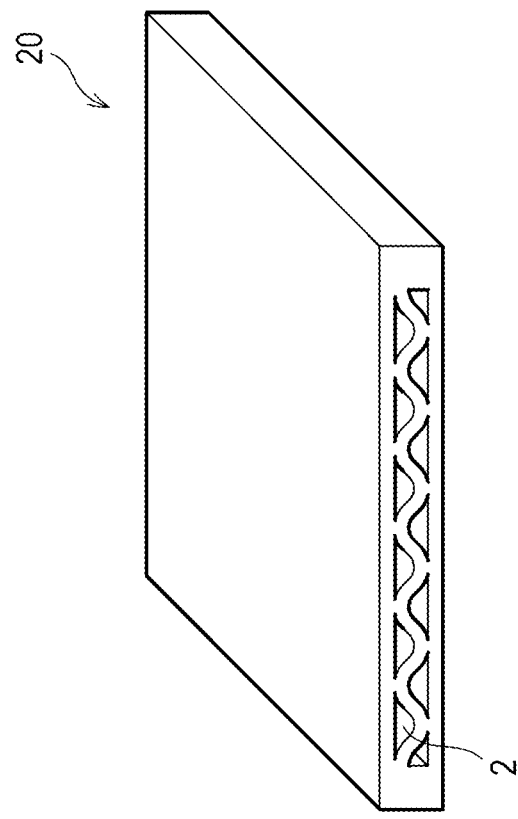

Next, at least a part of a main surface of the first flow passage plate is subjected to plastic working to deform the first set of flow passages, thus forming recesses 32 at the main surface (FIG. 10B). The portion where the recesses 32 are formed is hereinafter referred to as plastically deformed portion 34.

A second flow passage plate 30 including the plastically deformed portion 34 in its main surface can be thus obtained.

Second joining process

Next, the second joining process in the manufacturing method of the invention is described.

In the second joining process, a plurality of second flow passage plates 30 are stacked on top of each other and main surfaces of the plurality of second flow passage plates are joined together through spacers, thus forming, between one second flow passage plate 30 and another second flow passage plate 30, a second set of flow passage 4 which is not parallel to the first set of flow passages 2 and where a second fluid flows.

Figure 11B:
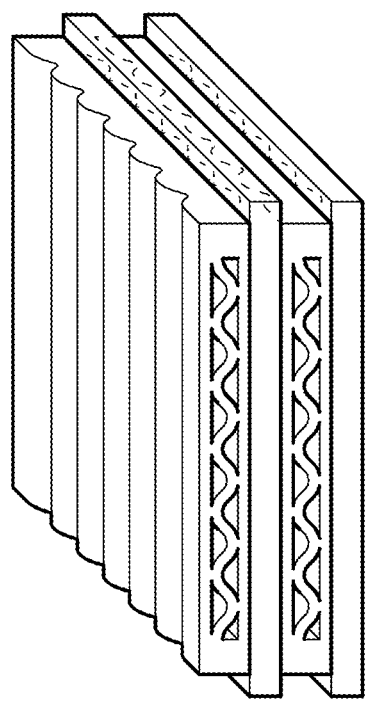
FIGS. 11A to 11C are schematic views for illustrating a second joining process in the manufacturing method of the invention.
Figure 11C:
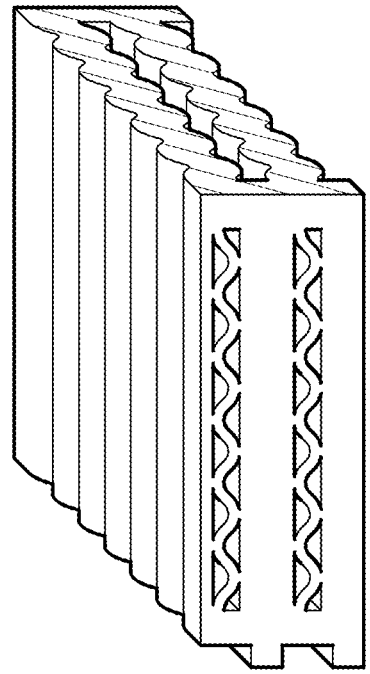
Figure 11A:
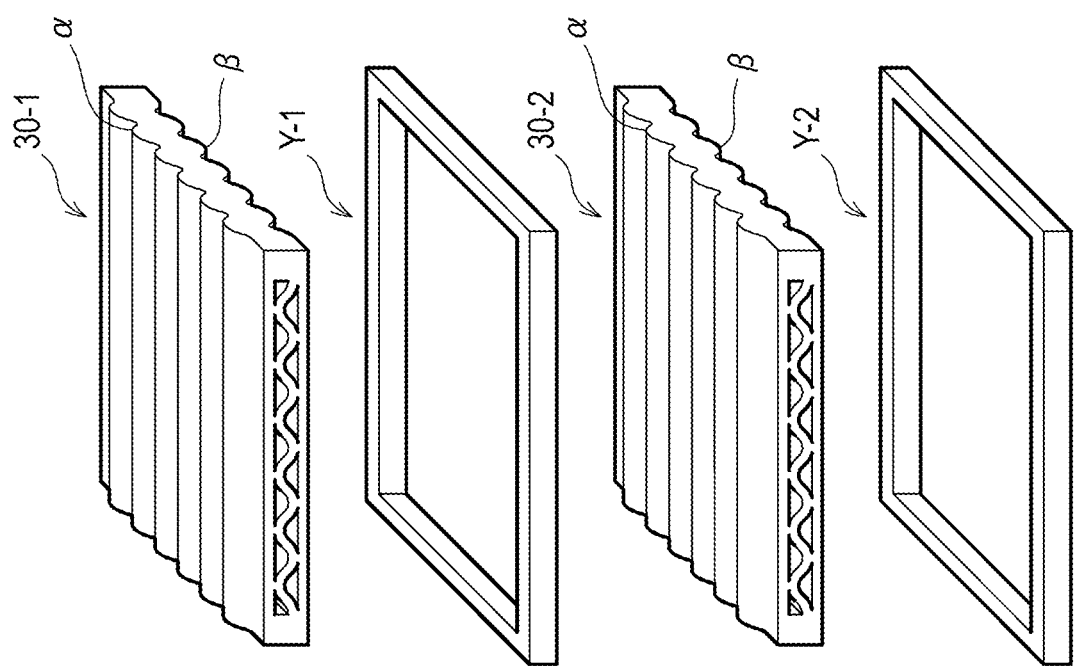

FIGS. 11A to 11C show a preferred embodiment of the second joining process. The second joining process in the manufacturing method of the invention is not limited to the preferred embodiment to be described with reference to FIGS. 11A to 11C.

In this embodiment, flat plate-like spacers Y each of which is processed so as not to have a portion in contact with the plastically deformed portion 34 even after main surfaces of the flat plate-like spacer and its corresponding second flow passage plate 30 are brought into close contact with each other are first prepared. In the manufacturing method of the invention, the spacers may not have a flat plate-like shape. Any spacer may be used as long as the distance between the second flow passage plates 30 can be kept. The spacers may have, for example, a point-like shape or a pillar shape.

For instance, each spacer Y can be obtained by preparing a plate which is made of the same material as that of the flat plate R for upper surface and has a slightly larger size than that of the flat plate R for upper surface, and punching the prepared plate.

The plastically deformed portion 34 of each second flow passage plate 30 is formed by plastic working, and therefore recesses (recessed portions) are formed at one main surface of the second flow passage plate 30 and protrusions are formed at the other main surface of the second flow passage plate 30. The thickness of each spacer Y is adjusted depending on the size of the protrusions of its corresponding second flow passage plates 30. In other words, the thickness of the spacer is adjusted so that the top α of each protrusion in one second flow passage plate 30-2 does not come into contact with another second flow passage plate 30-1 in the state of FIG. 11B to be described later but that the distance therebetween is reduced as described with reference to FIG. 1B and the like. More specifically, when, in the second flow passage plate 30-2 and the second flow passage plate 30-1 which is another second flow passage plate and is adjacent thereto through one spacer Y-1, the top of the protrusion of the former nearest to the latter is taken as the point a and the top of the protrusion of the latter nearest to the former is taken as the point β as described with reference to FIG. 1B and the like, the point α is present on the side nearer to the latter than the point β as shown in FIG. 1B, FIG. 2B, and FIG. 3B. This means that the intervals between the second flow passage plates are very small and the obtained device of the invention has thus an increased heat transmission coefficient.

Next, a plurality of plates serving as the second flow passage plates 30 are stacked on top of each other. More specifically, as shown in FIG. 11A and FIG. 11B, a first plate 30-1 serving as the second flow passage plate, a first spacer Y-1, a second plate 30-2 serving as the second flow passage plate, and a second spacer Y-2 are stacked on top of each other in this order.

Then, their respective main surfaces are joined together.

In the second joining process, the main surfaces of the second flow passage plates and the spacers Y are preferably joined together by diffusion bonding.

In this case, the obtained heat transport device has thus a higher strength.

The invention claimed is:

1. A heat transport device comprising:
a first set of flow passages for flowing a first fluid;
a second set of flow passages for flowing a second fluid; and a cross-section A satisfying Requirement 1, Requirement 2, and Requirement 3, wherein Requirement 1 is that the cross-section A is a cross-section perpendicular to the second set of flow passages and an interior of the cross-section A is a unified structure and has only a metal surface, Requirement 2 is that at the cross-section A, holes of the second set of flow passages are separated by a plurality of partition plates stacking along a first direction, each of the plurality of partition plates having alternating recesses and protrusions along a second direction perpendicular to the first direction, the plurality of partition plates are positioned parallel in a layered form along the first direction, and when at least a pair of partition plates which are adjacent two partition plates are named as a partition plate B and a partition plate C, respectively, and a point α which is a peak apex of the partition plate B facing, along the first direction, the partition plate C on a surface of the partition plate B, which faces a first passage of the second set of flow passages, is compared with a point β which is a valley apex of the partition plate C facing, along the first direction, the partition plate B on a surface of the partition plate C, which faces the first passage of the second set of flow passages, the point α is present on a first line extending along the second direction, the point β is present on a second line extending along the second direction, and the first line is located closer toward a side of a peak apex of the partition plate C than the second line, and a space between the pair of partition plates corresponds to the first passage of the second set of flow passages as one of the holes in which the second fluid flows, and Requirement 3 is that the first set of flow passages are formed in an inside of one partition plate of the plurality of partition plates, and the first set of flow passages are not parallel to the second set of flow passages.

2. The heat transport device according to claim 1,
wherein, in Requirement 3, the first set of flow passages are formed in the inside of each partition plate of the plurality of partition plates.

3. The heat transport device according to claim 1,
wherein the first set of flow passages extend along the second direction, and
the second set of flow passages extend along a third direction perpendicular to the first and second directions.

4. The heat transport device according to claim 2,
wherein the first set of flow passages extend along the second direction, and
the second set of flow passages extend along a third direction perpendicular to the first and second directions.

5. The heat transport device according to claim 1,
wherein the second set of flow passages extend along a third direction perpendicular to the first and second directions, and
the first set of flow passages extend along a fourth direction that is diagonal to each of the second and third directions.

6. The heat transport device according to claim 2,
wherein the second set of flow passages extend along a third direction perpendicular to the first and second directions, and
the first set of flow passages extend along a fourth direction that is diagonal to each of the second and third directions.

* * * * *